(12) United States Patent
Kraemer

(10) Patent No.: US 8,775,005 B2
(45) Date of Patent: Jul. 8, 2014

(54) METHOD FOR OPERATING A HYBRID VEHICLE

(71) Applicant: Bayerische Motoren Werke Aktiengesellschaft, Munich (DE)

(72) Inventor: Oliver Kraemer, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/912,440

(22) Filed: Jun. 7, 2013

(65) Prior Publication Data

US 2013/0274981 A1    Oct. 17, 2013

Related U.S. Application Data

(63) Continuation of application No. PCT/EP2012/053905, filed on Mar. 7, 2012.

(30) Foreign Application Priority Data

Mar. 18, 2011  (DE) .................. 10 2011 005 803

(51) Int. Cl.
*B60K 6/20* (2007.10)
(52) U.S. Cl.
USPC .................. 701/22; 180/65.265; 903/930
(58) Field of Classification Search
USPC .......... 701/22, 70, 101, 110; 180/65.1, 65.21, 180/65.23, 65.265, 65.275, 65.28, 65.285, 180/65.29; 903/902–908, 930
See application file for complete search history.

(56) References Cited

U.S. PATENT DOCUMENTS 6,543,561 B1 * 4/2003 Pels et al. ................... 180/65.23
(Continued)

FOREIGN PATENT DOCUMENTS

DE         44 22 636 A1      1/1996
DE        198 14 402 A1     10/1999
(Continued)

OTHER PUBLICATIONS

International Search Report dated May 29, 2012 including English-language translation (Four (4) pages).

(Continued)

*Primary Examiner* — Thomas Black
*Assistant Examiner* — Ce Li
(74) *Attorney, Agent, or Firm* — Crowell & Moring LLP

(57) ABSTRACT

A method is provided for operating a hybrid vehicle equipped with an internal-combustion engine and an electric drive for generating vehicle propulsion. The vehicle selectively is driven in a first operating mode exclusively by the electric drive or in a second operating mode is driven by the internal combustion engine and by the electric drive, or in a third operating mode is driven exclusively by the internal combustion engine. In the first operating mode, the driver predefines a desired driving torque via a selection element. The first operating mode is maintained even if the desired driving torque is greater than a maximal driving torque that can presently be supplied by the electric motor.

7 Claims, 1 Drawing Sheet

(56) References Cited

U.S. PATENT DOCUMENTS

| | | | |
|---|---|---|---|
| 7,077,223 B2* | 7/2006 | Kubodera et al. | 180/65.225 |
| 8,332,088 B2* | 12/2012 | Saito | 701/22 |
| 8,417,406 B2* | 4/2013 | Bichler et al. | 701/22 |
| 8,566,013 B2* | 10/2013 | Davis et al. | 701/123 |
| 2003/0221883 A1* | 12/2003 | Kubodera et al. | 180/65.2 |
| 2009/0287366 A1* | 11/2009 | Davis et al. | 701/22 |
| 2010/0063661 A1* | 3/2010 | Saito | 701/22 |
| 2011/0106353 A1* | 5/2011 | Brocke et al. | 701/22 |
| 2011/0213523 A1* | 9/2011 | Bichler et al. | 701/22 |

FOREIGN PATENT DOCUMENTS

| | | |
|---|---|---|
| DE | 10 2008 000 577 A1 | 9/2009 |
| DE | 10 2008 056 972 A1 | 5/2010 |
| EP | 1 366 949 A1 | 12/2003 |
| EP | 2 133 252 A1 | 12/2009 |

OTHER PUBLICATIONS

German Examination Report dated Oct. 17, 2011 including partial English-language translation (Six (6) pages).

* cited by examiner

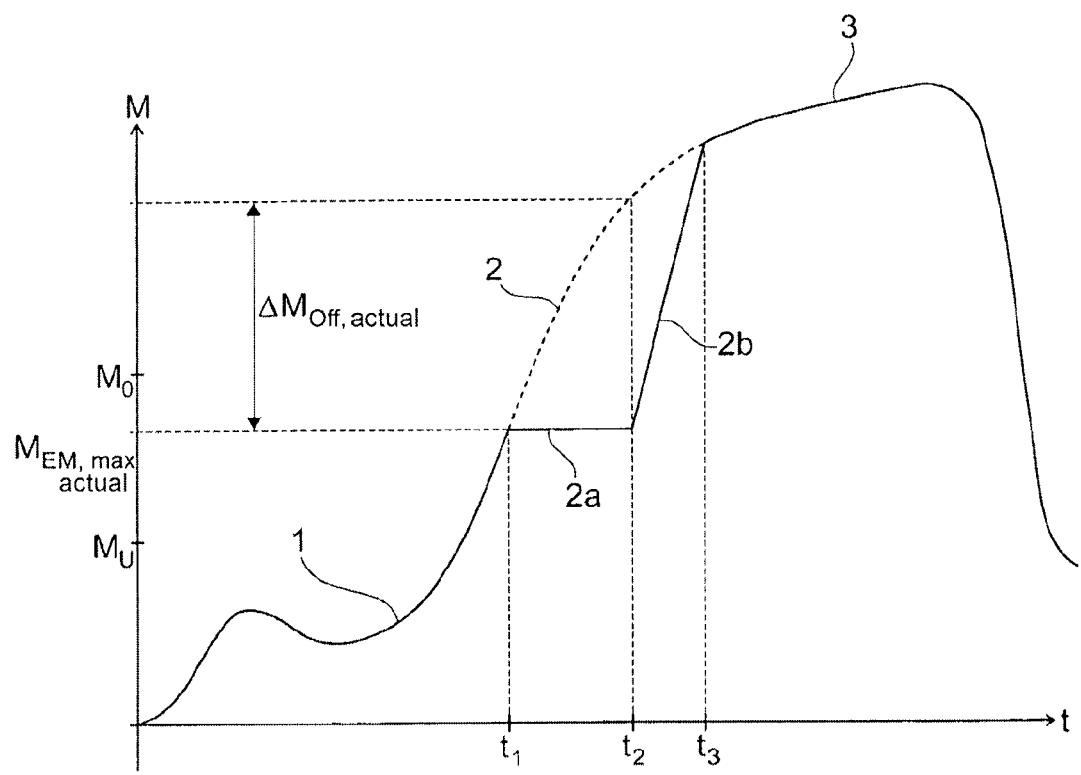

METHOD FOR OPERATING A HYBRID VEHICLE

CROSS REFERENCE TO RELATED APPLICATIONS

This application is a continuation of PCT International Application No. PCT/EP2012/053905, filed Mar. 7, 2012, which claims priority under 35 U.S.C. §119 from German Patent Application No. DE 2011 005 803.6, filed Mar. 18, 2011, the entire disclosures of which are herein expressly incorporated by reference.

BACKGROUND AND SUMMARY OF THE INVENTION

The present invention relates to a method of operating a hybrid vehicle and, in particular, to a method of operating a hybrid vehicle which has an internal-combustion engine and an electric drive provided for generating vehicle propulsion.

In the following, the term "hybrid vehicle" will apply to a vehicle having an internal-combustion engine and at least one electric motor provided for generating vehicle propulsion. A hybrid vehicle of this type can selectively be operated exclusively by the electric motor (purely electric operating mode) in a first operating mode or, in a second operating mode in which the internal-combustion engine as well as the electric motor will drive the vehicle. Naturally, the vehicle can also be operated in a third operating mode exclusively by the internal-combustion engine.

When the vehicle is operated in the first operating mode, i.e. purely electrically, the driver has to actuate the accelerator in a very sensitive manner. When the desired drive torque prompted by the driver by way of the accelerator pedal exceeds the torque maximally producible by the electric motor, a change takes place to the second operating mode by connecting the internal-combustion engine, which the driver would like to avoid, for example, when driving in the city. The situation in which the electronic system changes to the second operating mode by connecting the internal-combustion engine occurs particularly when the driver wants to maximally use the power offered by the electric motor, i.e. when driving at the upper electric power limit.

It is an object of the invention to indicate a method of operating a hybrid vehicle, wherein the internal-combustion engine is additionally started less frequently than in the case of conventional hybrid driving.

This and other objects are achieved by a method of operating a hybrid vehicle which has an internal-combustion engine and an electric drive provided for generating vehicle propulsion. The vehicle is selectively driven in a first operating mode, exclusively by the electric drive, in a second operating mode by the internal-combustion engine and by the electric drive, or in a third operating mode, exclusively by the internal-combustion engine. In the first operating mode, the driver predefines a desired drive torque by way of a selection element. The first operating mode is maintained at least in some operating conditions even if the desired drive torque is greater than a maximal drive torque that can presently be provided by the electric drive. Advantageous embodiments and further developments of the invention are described and claimed herein.

The invention is based on not additionally starting the internal-combustion engine in all situations in which the desired drive torque prompted by the driver by way of the selection element (for example, the gas pedal) exceeds the maximal drive torque that can presently be provided by the electric motor.

Rather, the invention consists of continuing to drive in the first operating mode, i.e. purely electrically, in at least some or in defined operating conditions, even if the desired drive torque is (slightly) greater than the maximal drive torque that can presently be provided by the electric motor. When sensitively actuating the selection element—which, in the following, is called an accelerator pedal—the driver therefore feels that, starting at a defined desired drive torque, i.e. starting at a defined position of the accelerator pedal, the overall drive torque will at first not increase even if the actuating of the accelerator pedal is slightly more intense. As a result, the driver receives an "acknowledgment" that the "electric drive" has reached its actual power and torque limit.

In contrast to conventional hybrid vehicles, a "slight" exceeding of the desired drive torque corresponding to the "power limit" or "torque limit" of the electric drive therefore does not immediately result in a change to the second operating mode, i.e. not directly in the starting of the internal-combustion engine.

Rather, the first operating mode is maintained as long as the desired drive torque prompted by the driver by way of the accelerator pedal is greater by, at the most, a predefined differential drive torque than the maximal drive torque that can presently be provided by the electric motor. When, while actuating the accelerator pedal, the driver reaches the position which corresponds to the maximal drive torque that can presently be provided by the electric motor, the driver can continue to depress the accelerator pedal by a pedal travel that corresponds to the differential drive torque, without an additional starting of the internal-combustion engine.

According to a further development of the invention, the amount of the differential drive torque is a function of how fast the driver actuates the accelerator pedal. More precisely, the amount of the differential drive torque is a function of how fast the driver actuates the selection element when exceeding the accelerator pedal position to which the maximal drive torque corresponds that can presently be provided by the electric motor. When the accelerator pedal position is described by an angle coordinate or by a travel coordinate, the differential drive torque is a function of the time derivation of the angle coordinate or time coordinate, i.e. of the gradient of the angle coordinate or time coordinate describing the accelerator pedal position.

According to a further development of the invention, it is provided that a change takes place to the second operating mode or to the third operating mode (pure internal-combustion engine operation) when the desired drive torque prompted by the driver by way of the accelerator pedal is greater than the sum of the maximal drive torque that can presently be provided by the electric motor and of the differential drive torque. Therefore, when the driver continues to relatively strongly depress the accelerator pedal as the maximal drive torque is reached that can presently be provided by the electric motor, the internal-combustion engine will be started and a pure internal-combustion engine operation or a combined internal-combustion engine and electric motor operation will take place.

In the case of a change from the first to the second or third operating mode, the overall drive torque at which the hybrid vehicle is driven has to be raised to the desired drive torque prompted by the driver by way of the accelerator pedal. The "raising" may take place according to a predefined function. For example, it may be provided that the overall drive torque—to the extent that it can be displayed with respect to the power—is raised according to a linear function from the maximal drive torque that can presently be provided by the electric motor to the desired drive torque.

Other objects, advantages and novel features of the present invention will become apparent from the following detailed description of one or more preferred embodiments when considered in conjunction with the accompanying drawings.

BRIEF DESCRIPTION OF THE DRAWINGS

The single FIG. 1 illustrates a torque-time diagram by which the basic principle of the invention can be explained.

DETAILED DESCRIPTION OF THE DRAWINGS

FIG. 1 illustrates a diagram in which the time t is plotted on the abscissa, and the torque M is plotted on the ordinate. The torque $M_{EM, \, max, \, actual}$ represents the maximal drive torque that can presently be generated by the electric motor—or, in general, by the electric drive—of the vehicle.

The maximal drive torque $M_{EM, \, max, \, actual}$ that can presently be provided by the electric drive is a function of several or of a plurality of input parameters, such as the charge state level of an electric energy accumulator which supplies the electric drive or the electric motor; the temperature condition of the electric energy accumulator, the rotational speed of the electric drive or the electric motor, etc. As a function of the parameters determining the amount of the maximal drive torque $M_{EM, \, max, \, actual}$, which can presently be provided, is in a range between a lower torque $M_u$ and an upper torque $M_o$.

As an example, the curve progression composed of curve sections 1, 2, 3 represents the course of a "desired drive torque" prompted by a driver by way of a selection element, for example, a gas pedal.

The desired drive torque is the desired overall drive torque that is prompted by the driver by way of the accelerator pedal. In the curve section 1, the desired drive torque is lower than the maximal drive torque that can presently be provided by the electric motor. This means that the vehicle can be operated purely electrically without any problem, in which case the overall drive torque can be adjusted corresponding to the desired drive torque predefined by the driver by way of the accelerator pedal.

At the point in time $t_1$, the desired drive torque reaches the maximal drive torque $M_{EM, \, max, \, actual}$ which the electric motor can presently provide.

In the example illustrated in FIG. 1, the driver further depresses the accelerator pedal when the power limit of the electric drive ($M_{EM, \, max, \, actual}$) has been reached, which is illustrated by the curve section 2 shown by a broken line. In the area of the curve section 2, the desired drive torque is greater that the maximal drive torque $M_{EM \, max, \, actual}$ that can presently be provided by the electric motor. However, even though the driver is further depressing the accelerator pedal, the vehicle will remain in the first, i.e. the purely electric operating mode, which is represented by the curve section 2a. Although the driver prompts a desired drive torque that is greater than the maximal drive torque $M_{EM \, max, \, actual}$ that can presently be provided by the electric motor, the overall drive torque is at first maintained at the maximal drive torque $M_{EM \, max, \, actual}$ that can presently be provided by the electric motor.

Since, in the "driving example" illustrated in FIG. 1, the driver depresses the accelerator pedal to a considerable extent, a change takes place to the second or third operating mode, and the internal-combustion engine is started. At the point in time $t_2$, the desired drive torque prompted by the driver by way of the accelerator pedal exceeds the maximal drive torque $M_{EM \, max, \, actual}$ that can presently be provided by the electric motor, by an amount $\Delta M_{Off, actual}$. The exceeding of the maximal drive torque $M_{EM \, max, \, actual}$ that can presently be provided by the electric motor, by the differential torque $\Delta M_{Off, actual}$ is considered to be the triggering criterion for the additional starting of the internal-combustion engine. The internal-combustion engine is therefore additionally started at the point in time $t_2$. Subsequently, the overall drive torque is "raised" according to a predefined ramp function represented by the curve section 2b to the desired drive torque prompted by the driver by way of the accelerator pedal. At the point in time $t_3$, the overall drive torque reaches the desired drive torque prompted by the driver by way of the gas pedal. Subsequently, in the second or third operating mode, the overall drive torque is adjusted corresponding to the desired drive torque prompted by the driver by way of the accelerator pedal (compare curve section 3).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a hybrid vehicle having an internal-combustion engine and an electric drive configured for generating vehicle propulsion, the method comprising the acts of:
   selectively driving the vehicle in one of the following operating modes:
      in a first operating mode exclusively by the electric drive,
      in a second operating mode by the internal-combustion engine and the electric drive, or
      in a third operating mode exclusively by the internal-combustion engine;
   predefining a desired drive torque by way of a selection element in the first operating mode; and
   maintaining the vehicle in the first operating mode at least in certain operating conditions even if the desired drive torque is greater than a maximal drive torque that is presently providable by the electric drive, wherein
      the first operating mode is maintained as long as the desired drive torque is greater by a predefined differential drive torque than the maximal drive torque presently providable by the electric drive, and
      an amount of the predefined differential drive torque is selected as a function of a speed by which the selection element is actuated.

2. The method according to claim 1, wherein the amount of the predefined differential drive torque is selected as the function of a speed by the selection element is actuated when a position is exceeded that represents the maximal drive torque presently providable by the electric drive.

3. The method according to claim 1, further comprising the acts of: changing the operating mode to the second or third operating mode when the predefined desired drive torque is greater than a sum of the maximal drive torque presently providable by the electric drive and the predefined differential drive torque.

4. The method according to claim 3, wherein, during a change from the first operating mode to the second or third operating mode, an overall drive torque by which the hybrid vehicle is driven is increased according to a predefined function from the maximal drive torque presently providable by the electric drive to the desired drive torque.

5. The method according to claim 4, wherein the predefined function is a linear function over time.

6. The method according to claim 1, wherein, during a change from the first operating mode to the second or third operating mode, an overall drive torque by which the hybrid vehicle is driven is increased according to a predefined function from the maximal drive torque presently providable by the electric drive to the desired drive torque.

7. The method according to claim 6, wherein the predefined function is a linear function over time.

* * * * *